(12) United States Patent
Miura et al.

(10) Patent No.: US 7,438,235 B2
(45) Date of Patent: Oct. 21, 2008

(54) NON-CONTACT INFORMATION MEDIUM AND COMMUNICATION SYSTEM USING NON-CONTACT INFORMATION MEDIUM

(75) Inventors: Masayuki Miura, Kanagawa (JP); Minoru Komiya, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 176 days.

(21) Appl. No.: 10/566,988

(22) PCT Filed: Jul. 30, 2004

(86) PCT No.: PCT/JP2004/011316

§ 371 (c)(1), (2), (4) Date: Feb. 2, 2006

(87) PCT Pub. No.: WO2005/013501

PCT Pub. Date: Feb. 10, 2005

(65) Prior Publication Data

US 2006/0196941 A1      Sep. 7, 2006

(30) Foreign Application Priority Data

Aug. 4, 2003    (JP)    ............................. 2003-285884

(51) Int. Cl.
    *G06K 19/06*    (2006.01)

(52) U.S. Cl. .................. 235/492; 235/439; 235/451
(58) Field of Classification Search .................. 235/451, 235/492, 439, 441, 444, 476

See application file for complete search history.

(56) References Cited

U.S. PATENT DOCUMENTS

| 6,173,900 B1 * | 1/2001 | Yoshigi et al. ............... 235/492 |
| 6,343,744 B1 | 2/2002 | Shibata et al. |
| 6,386,459 B1 * | 5/2002 | Patrice et al. ............... 235/492 |
| 2003/0178483 A1 * | 9/2003 | Wakabayashi ............... 235/380 |

FOREIGN PATENT DOCUMENTS

| JP | 2000-269725 | 9/2000 |
| JP | 2000-306066 | 11/2000 |
| JP | 2001-34725 | 2/2001 |
| JP | 2003-228693 | 8/2003 |

* cited by examiner

*Primary Examiner*—Seung H Lee
(74) *Attorney, Agent, or Firm*—Edwards Angell Palmer & Dodge LLP

(57) ABSTRACT

A noncontact information medium includes a coil formed by a conductor, a capacitor that forms a resonance circuit together with the coil, an IC chip that controls information transmitted to and received from a reader-writer. The coil has a cutoff part formed by cutting off at least a part of the conductor.

7 Claims, 9 Drawing Sheets

13a
CUTOFF PART

13b
CUTOFF PART

NON-CONTACT INFORMATION MEDIUM AND COMMUNICATION SYSTEM USING NON-CONTACT INFORMATION MEDIUM

BACKGROUND OF THE INVENTION

1. Field of the Invention

The present invention relates to a noncontact information medium and a communication system that use the noncontact information medium. More specifically, the invention relates to a noncontact information medium capable of accurately performing communications even when a plurality of noncontact information media are overlapped, and a communication system that uses the noncontact information medium.

2. Description of the Related Art

An information medium is classified into a contact type or a noncontact type according to the communications method employed by the IC chip included in the medium to communicate with a reader-writer. Among these, the noncontact information medium does not cause any contact failure because it does not contact with the reader-writer and can be used movably and remotely from the reader-writer. In addition, the noncontact information medium is characterized by high resistance against dust, rain, and static electricity and by higher security. As a result, demand for the noncontact information medium is rising.

A typical noncontact information medium operates as follows. The noncontact information medium receives electromagnetic waves from a reader-writer and obtains operating power by electromagnetic induction. The noncontact information medium transmits data to and receives data from the reader-writer via radio waves. The noncontact information medium and the reader-writer include an antenna for transmitting and receiving the radio waves.

FIG. 12 is a schematic of a conventional noncontact information medium. A conventional noncontact information medium 100 includes a coil 102 acting as an antenna that receives power from outside and that transmits and receives data, a capacitor 104 that forms, together with the coil 102, a resonance circuit, and an IC chip 105 that controls an operation of the noncontact information medium 100. The noncontact information medium 100 has the IC chip 105 arranged generally in a central portion and the coil 102 provided around the IC chip 105.

To allow this noncontact information medium 100 to operate, the noncontact information medium 100 is brought closer to a reader-writer that transmits radio waves for transmission and reception. As a result, the coil 102 and the capacitor 104 of the noncontact information medium 100 resonate to generate an induced electromotive force, thereby carrying an induced current across the coil 102. This induced current serves as a power for a power supply of the IC chip 105, thereby allowing the IC chip 105 to operate and the noncontact information medium 100 to transmit data to the reader-writer via the coil 102. Thus, electromagnetic coupling between the reader-writer and the coil 102 of the noncontact information medium 100 enables transmission and reception of data between the noncontact information medium 100 and the reader-writer (see Japanese Patent Application Laid-open No. 2001-34725).

The conventional noncontact information medium is used under the assumption that one noncontact information medium does not interfere with a different noncontact information medium. However, when a plurality of noncontact information media are close to the reader-writer or when a plurality of noncontact information media overlap, data transmission and reception cannot be accurately performed. As shown in FIG. 13, when two the noncontact information media 100 of same size are overlapped, in particular, then the coils 102 serving as their respective antennas are located at the same position, and two the noncontact information media 100 interfere with one another. This results in disturbance of a resonance frequency, an unstable communication state, and an inability of holding a communication.

Furthermore, when power is fed from the reader-writer to each of a plurality of noncontact information media within a communicable area, it is necessary for the reader-writer to have a substantial feeding ability so as to enable communicating with all the noncontact information media. When the number of the noncontact information media is large, however, the reader-writer is unable to efficiently feed power to all the noncontact information media.

The present invention has been achieved in view of the problems in the conventional technology. It is an object of the invention to provide a noncontact information medium that can perform communication even when a plurality of noncontact information media overlap, and a communication system that uses the noncontact information medium.

SUMMARY OF THE INVENTION

According to an aspect of the present invention, a noncontact information medium includes a coil formed by a conductor; a capacitor that forms, together with the coil, a resonance circuit; and a control circuit that controls information transmitted and received to and from a reader-writer. The coil has at least a part of the conductor cut off.

According to the above noncontact information medium, by cutting off a part of the conductor of the coil, a frequency, at which a communication can be held with the reader-writer, is generated when many noncontact information media are close to the reader-writer and the noncontact information media can communicate with the reader-writer. Therefore, even when a plurality of noncontact information media according to the present invention is overlapped, accurate communication can be established between the noncontact information media, which are communication targets, and the reader-writer.

According to another aspect, in the above noncontact information medium, the coil has an inductance for making a resonance frequency of the resonance circuit higher than a frequency of an electromagnetic wave transmitted from the reader-writer when the noncontact information medium is arranged solely.

According to another aspect, in the above noncontact information medium, the coil generates an inductance for making a resonance frequency of the resonance circuit equal to a frequency of an electromagnetic wave transmitted from the reader-writer when a plurality of the noncontact information media are arranged to be close to the reader-writer.

According to another aspect, the above noncontact information medium further includes an auxiliary coil substantially equal in inductance to the coil. The coil generates an inductance for making a resonance frequency of the resonance circuit equal to a frequency of an electromagnetic wave transmitted from the reader-writer when a plurality of the auxiliary coils are arranged to be close to the reader-writer.

According to another aspect, a communication system that holds a radio communication using electromagnetic induction, includes a plurality of noncontact information media each including a coil formed by a conductor at least a part of which is cut off; a capacitor that forms, together with the coil, a resonance circuit; and a control circuit that controls information transmitted and received through the resonance circuit; and a reader-writer that supplies an energy to the noncontact information media, that transmits data to the noncontact information media, and that receives the data transmitted from the noncontact information media.

According to another aspect, a communication system that holds a radio communication using electromagnetic induction, includes a noncontact information medium that includes a coil formed by a conductor at least a part of which is cut off; a capacitor that forms, together with the coil, a resonance circuit; and a control circuit that controls information transmitted and received through the resonance circuit; an auxiliary coil substantially equal in inductance to the coil of the noncontact information medium; and a reader-writer that supplies an energy to the noncontact information medium, that transmits data to the noncontact information medium, and that receives the data transmitted from the noncontact information medium.

DETAILED DESCRIPTION OF EXEMPLARY EMBODIMENTS

Figure 1:
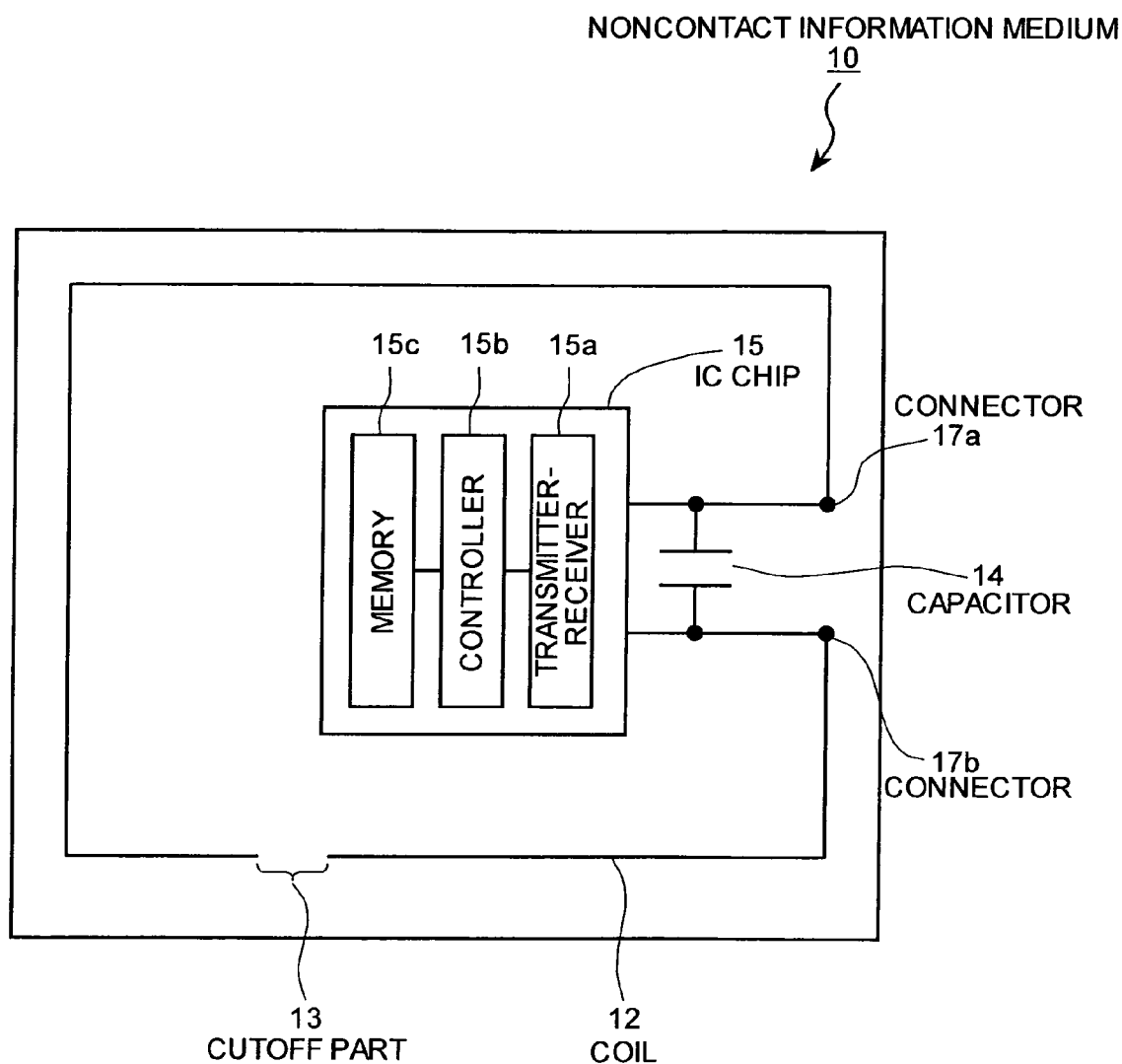
FIG. 1 is a schematic of a noncontact information medium according to an embodiment of the present invention.

Exemplary embodiments of a noncontact information medium and a communication system that uses the noncontact information medium according to the present invention are explained below with reference to the accompanying drawings. Note that the invention is not limited by the embodiments. In the description of the drawings, like reference numerals or letters are designated to like elements.

A noncontact information medium according to an embodiment of the present invention is explained first. The noncontact information medium according to the embodiment is characterized in that a part of a coil conductor is cut off. The noncontact information medium performs communications with a reader-writer that transmits radio waves for transmission and reception when the number of noncontact information media is equal to or larger than a predetermined number. In this embodiment, a so-called special premium, which is exchanged according to the number of prize media earned by a customer at a pachinko parlor and which includes an article exchangeable with money, will be explained as an example of the noncontact information medium.

FIG. 1 is a schematic of a noncontact information medium 10 according to the embodiment. FIG. 1 schematically depicts the noncontact information medium 10. The noncontact information medium 10 includes a coil 12, a capacitor 14, an IC chip 15, and connectors 17a and 17b that connect the coil 12 to the capacitor 14.

The coil 12 is provided around and around the IC chip 15. The coil 12 has a cutoff part 13. The coil 12 generates an induced electromotive force and supplies an induced current to the IC chip 15 connected to the coil 12 when the noncontact information medium 10 is brought closer to the reader-writer that generates the radio waves for transmission and reception. The coil 12 also functions as an antenna that receives the radio waves for transmission and reception from the reader-writer and transmits the radio wave to the IC chip 15, and that transmits data from the IC chip 15 to the reader-writer under predetermined conditions as will be explained later.

The capacitor 14 has a predetermined capacitance and forms a resonance circuit in cooperation with an inductance of the coil 12. The relationship among a resonance frequency fr of the resonance circuit, the inductance L of the coil 12, and the capacitance C of the capacitor 14 can be expressed by the following Equation (1):

$$f_r = 1/(2\pi\sqrt{LC}). \tag{1}$$

When the resonance frequency fr of the resonance circuit is set coincident with a frequency fc of the radio waves for transmission and reception, a high current can be applied to the coil 12 and to the capacitor 14.

The induced electromotive force generated by the coil 12 is supplied to the IC chip 15 from the coil 12. The IC chip 15 operates when this induced electromotive force is equal to a voltage at which the IC chip 15 is operable. The IC chip 15 includes a transmitter-receiver 15a that transmits a carrier wave according to the data to be transmitted to the coil 12, a controller 15b that controls the data relative to the received radio wave, and a memory 15c that stores predetermined data. The IC chip 15 controls the data to be transmitted and received. The memory 15c stores, for example, ID information, predetermined money types, a shop number, cipher data and the like. The my-d chip (manufactured by Infineon Technologies AG), for example, can be used as the IC chip 15.

Figure 2:
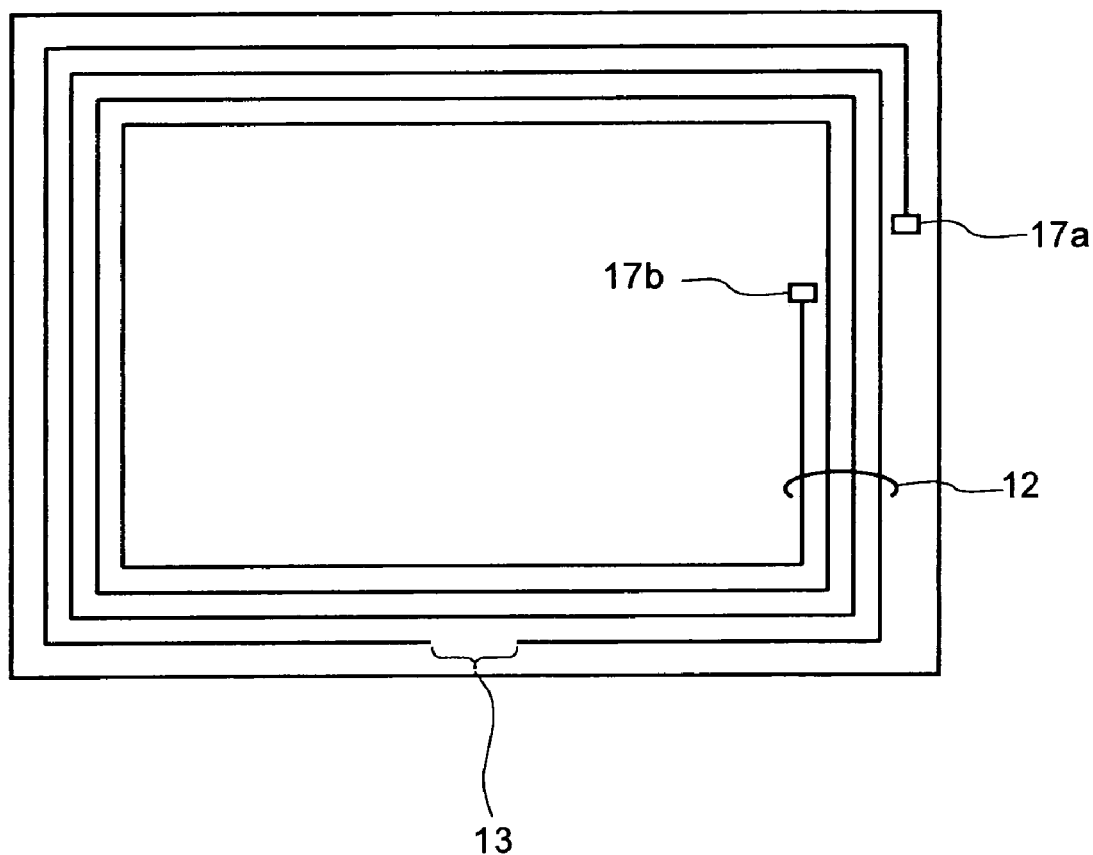
FIG. 2 is a schematic for explaining the shape of a coil shown in FIG. 1.

A shape of the coil 12 of the noncontact information medium 10 is explained. FIG. 2 is a schematic for explaining the shape of the coil 12. The coil 12 is formed by winding a conductor by predetermined turns, and the coil 12 has a part of this conductor cut off, i.e., the coil 12 has a cutoff part 13. The length of the cutoff part 13 is, for example, about 10 millimeters. Due to this, in the noncontact information medium 10, an alternating current is not easily generated in the coil 12 as compared to the medium in which the conductor is not cut off. Namely, the noncontact information medium 10 has higher impedance. When single unit of the noncontact information medium 10 is brought closer to the reader-writer, the induced current generated by magnetic inductance is low. For instance, the induced current generated in the noncontact information medium 10 is about 20% of the induced current generated in the noncontact information medium in which the conductor of the coil 12 is not cut off.

The single noncontact information medium 10 is lower in the inductance L of the coil 12 than the noncontact information medium in which the conductor of the coil 12 is not cut off. The resonance frequency of the resonance circuit of the noncontact information medium in which the conductor of the coil 12 is not cut off is equal to the frequency fc of the radio waves for transmission and reception. For this reason, the single noncontact information medium 10 has the resonance frequency fr higher than the frequency fc of the radio waves for transmission and reception transmitted from the reader-writer. Accordingly, the resonance frequency fr of the single noncontact information medium 10 does not coincide with the frequency fc of the radio waves for transmission and reception transmitted from the reader-writer. The single noncontact information medium 10 does not, therefore, hold a communication with the reader-writer.

In contrast, if the number of noncontact information media 10 that are near the reader-writer increases, the inductance L of the coil 12 of each noncontact information medium 10 increases. The reason is estimated as follows. When the coils 12 of the noncontact information media 10 are near the reader-writer, the coils 12 influence one another. Furthermore, as the number of noncontact information media 10 increases, a voltage supplied to the IC chip 15 of each noncontact information medium increases. If the voltage increases to the extent that the IC chip 15 is operable, then the IC chip 15 operates and can control data. It is assumed herein that the inductance L at which the resonance frequency fr coincides with the frequency fc of the radio waves for transmission and reception is Lc. If the number of the noncontact information media 10 that are near the reader-writer is such that the inductance L of the coil 12 of each noncontact information medium 10 is equal to Lc, then the resonance frequency fr coincides with the frequency fc of the radio waves for transmission and reception. In addition, the coil 12 of each noncontact information medium 10 can transmit data to and receive data from the reader-writer. The number of noncontact information media 10 by which the inductance L of each coil 12 is equal to Lc varies depending on the distance between the noncontact information media 10. When adjacent noncontact information media 10 are arranged 3 millimeters apart, for example, the number of noncontact information media 10 by which the inductance L is equal to Lc is equal to or larger than 15. When the distance is 1 millimeter, for example, the number of noncontact information media 10 by which the inductance L is equal to Lc is equal to or larger than eight. Furthermore, even when the number of noncontact information media 10 increases to be larger than that number, the inductance L of each coil 12 saturates substantially at Lc. Accordingly, a state where the resonance frequency fr substantially coincides with the frequency fc of the radio waves for transmission and reception is maintained.

A communication system that uses the noncontact information medium 10 is explained next. By using the noncontact information medium 10, this communication system can ensure holding an accurate communication even when a plurality of noncontact information media 10 overlaps.

Figure 3:
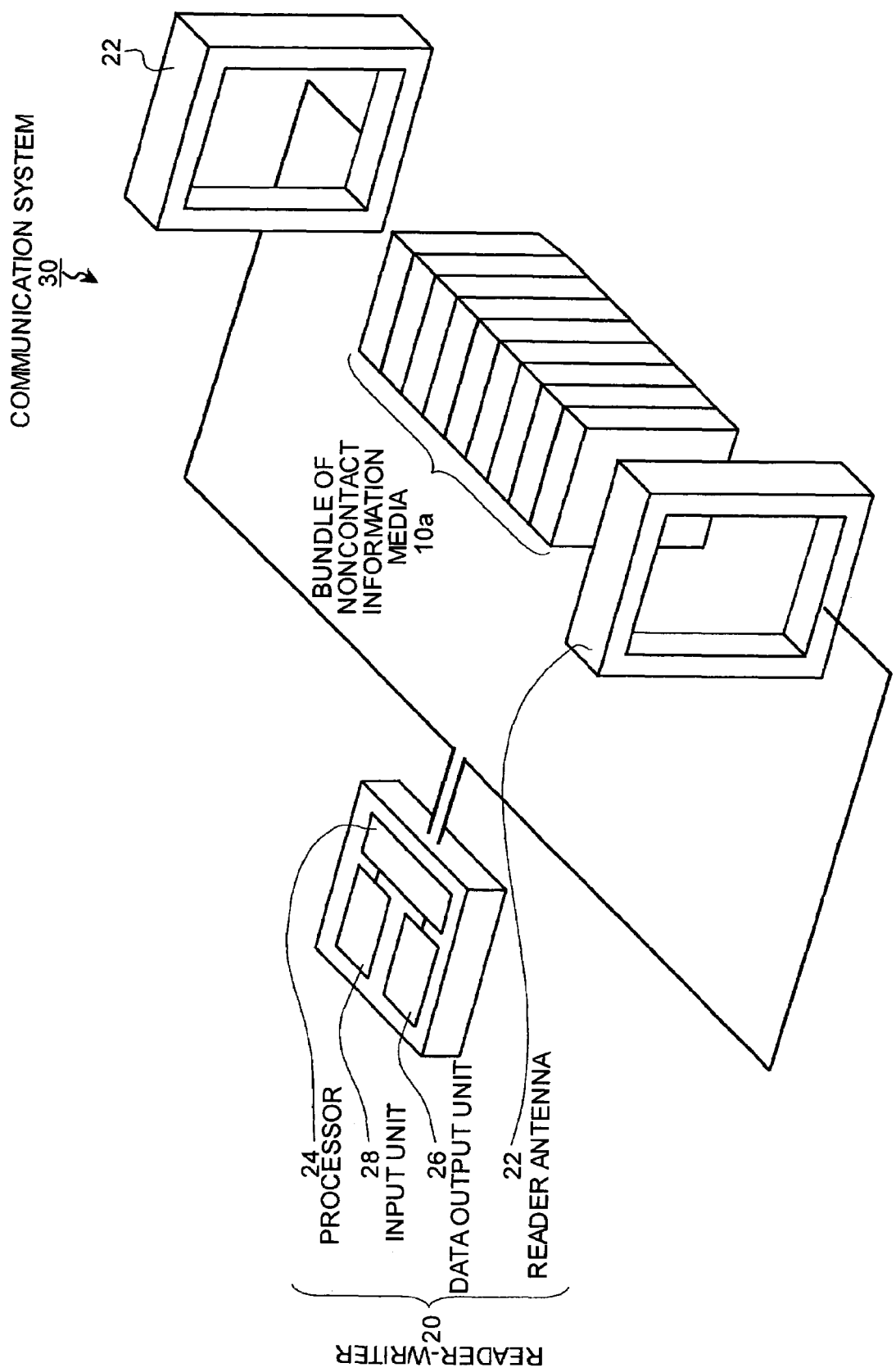
FIG. 3 is a perspective of a communication system according to the embodiment.

FIG. 3 is a perspective of the communication system according to the embodiment. A communication system 30 includes a bundle 10a of noncontact information media 10 and a reader-writer 20 that transmits data to and receives data from each noncontact information media in the bundle 10a. The noncontact information media 10 in the bundle 10a are arranged in an overlapping manner. The reader-writer 20 includes two reader antennas 22 for feeding power and transmitting and receiving data, a processor 24 that processes the data to be transmitted and received, a data output unit 26, and an input unit 28 that inputs an operation of the reader-writer 20. The reader-writer 20 includes an anti-collision function, so that the reader-writer 20 can receive data from the noncontact information media 10 in the bundle 10a in a batch process.

Figure 4:
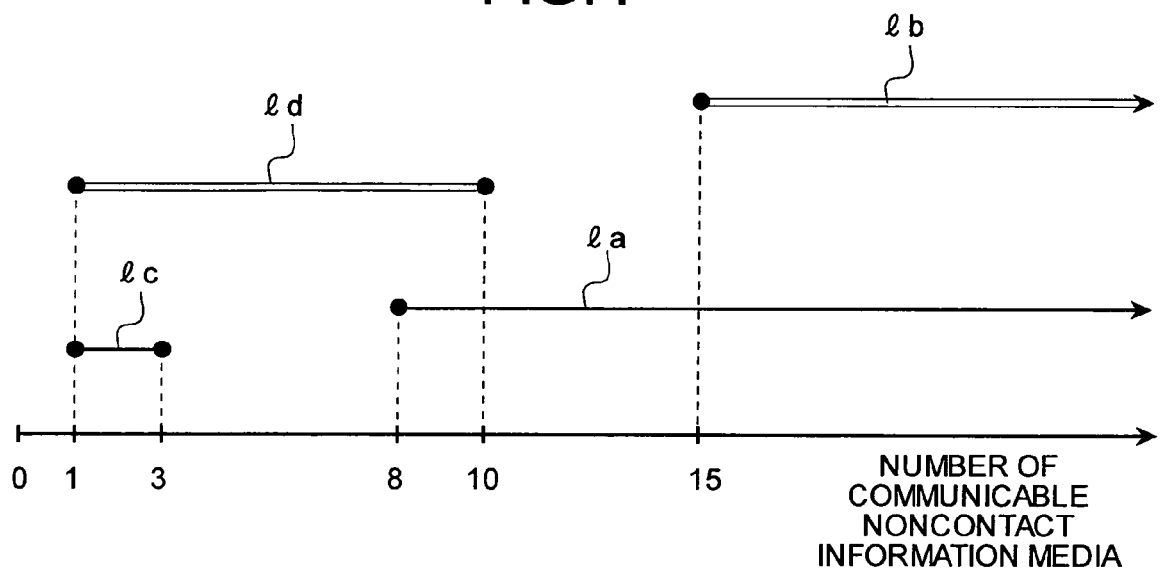
FIG. 4 is a schematic for explaining the number of noncontact information media with which the communication system shown in FIG. 3 can communicate.

The number of noncontact information media 10 with which this communication system 30 can communicate is explained next. FIG. 4 is a schematic for explaining the number of the noncontact information media 10 with which the communication system 30 can communicate. FIG. 4 also depicts an example of a communication system using conventional noncontact information media. Specifically, in FIG. 4, the following examples are shown with respect to the communication system 30, the number of communicable noncontact information media 10 if the noncontact information media 10 are arranged on a line la at distances of 1 millimeter, the number of communicable noncontact information media 10 if the noncontact information media 10 are arranged on a line lb at distances of 3 millimeters, the number of conventional communicable noncontact information media if the noncontact information media are arranged on a line lc at distances of 1 millimeter, and the number of conventional communicable noncontact information media if the noncontact information media are arranged on a line ld at distances of 3 millimeters. As the conventional noncontact information media, the noncontact information media in each of which the conductor of the coil is not cut off are used.

As seen from the lines lc and ld in FIG. 4, in case of the conventional noncontact information media, when four or more of them are overlapped at distances of 1 millimeter, communication cannot be established between the reader-writer and the noncontact information media. Moreover, in case of the conventional noncontact information media, when eleven or more of them are overlapped at distances of 3 millimeters, communication cannot be established between the reader-writer and the noncontact information media. When distances between the noncontact information media are shorter, smaller number of the noncontact information media can communicate with the reader-writer. This is because the coils of the respective noncontact information media interfere with one another, and the resonance frequencies of the noncontact information media change and do not coincide with the frequency of the radio waves for transmission and reception.

On the other hand, as seen from the lines la and lb in FIG. 4, in case of the noncontact information media 10, when eight or more of them are overlapped at distances of 1 millimeter, communication can be established between the reader-writer and the noncontact information media 10. Moreover, if 15 or more noncontact information media 10 are overlapped at distances of 3 millimeters, communication can be established between the reader-writer and the noncontact information media 10. Whether the noncontact information media 10 are arranged at distances of 1 millimeter or 3 millimeters, a maximum number of communicable noncontact information media 10 is equal to a maximum number of noncontact information media 10 with which the reader-writer 20 can communicate. The number is, for example, 40 or more. Thus, the noncontact information media 10 that can communicate with the, reader-writer 20 increases if the noncontact information media 10 are arranged closer to each other. The reason is as follows. If the noncontact information media 10 are overlapped by a predetermined number or more, the inductance L of the coil 12 of each noncontact information medium 10 increases up to Lc, and the resonance frequency fr of each noncontact information medium 10 is equal to the frequency fc of the radio waves for transmission and reception.

As can be understood, as long as the number of noncontact information media 10 is equal to or larger than the predetermined number, the noncontact information media 10 and the reader-writer 20 in the communication system 30 can communicate with each other even when the noncontact information media 10 overlap. An instance that the noncontact information media 10 communicate with the reader-writer 20 when the number of noncontact information media 10 is smaller than the predetermined number of noncontact information media 10 communicable with the reader-writer 20 is explained. In this case, an auxiliary card that includes a coil that enables holding a communication is arranged near the noncontact information medium 10. By doing so, the communication between the noncontact information media 10 and the reader-writer 20 is realized.

Figure 5:
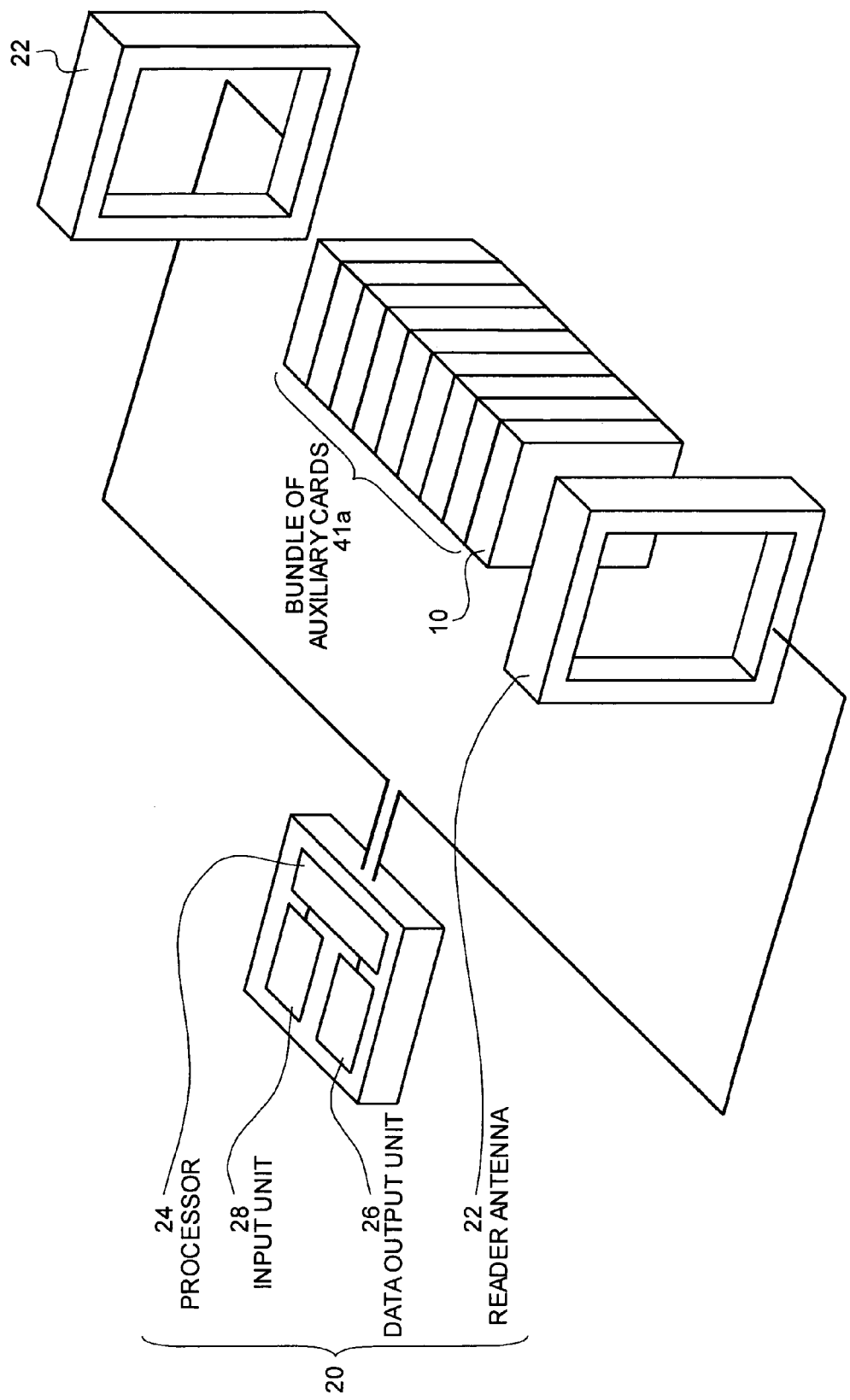
FIG. 5 is a schematic for explaining communications between the noncontact information medium and a reader-writer according to the embodiment.

FIG. 5 is a schematic for explaining communications between a single noncontact information medium 10 and the reader-writer 20. As shown in FIG. 5, a bundle 41a of auxiliary cards is overlapped on the noncontact information medium 10. By arranging the bundle 41a of the auxiliary cards near the noncontact information medium 10, the noncontact information medium 10 can communicate with the reader-writer 20.

Figure 6:
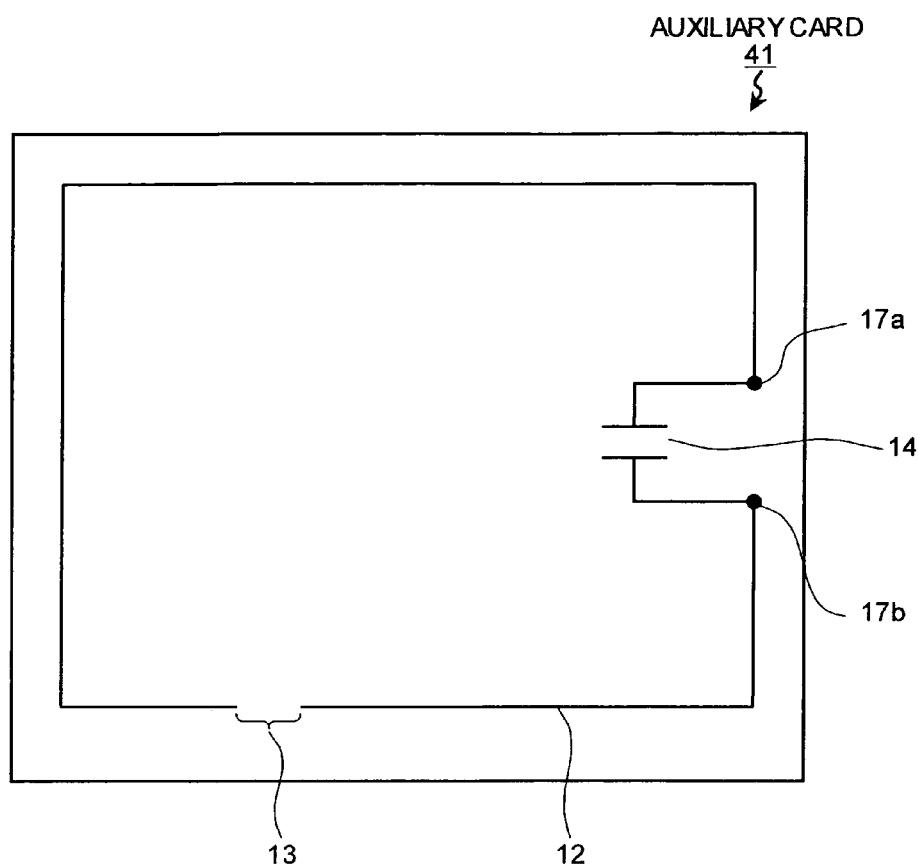
FIG. 6 is a schematic of an auxiliary card.

An auxiliary card 41 that enables the communication between the noncontact information medium 10 and the reader-writer 20 is explained next. FIG. 6 is a schematic configuration diagram of the auxiliary card 41. The auxiliary card 41 includes a coil 12, a capacitor 14, and connectors 17a and 17b that connect the coil 12 to the capacitor 14. That is, the auxiliary card 41 does not include an IC chip. The coil 12 of the auxiliary card 41 has a cutoff part 13 similarly to the noncontact information medium 10. As a result of this, it is considered that the inductance L of the coil 12 of the auxiliary card 41 is substantially the same as that of the coil 12 of the noncontact information medium 10. Accordingly, when a plurality of auxiliary cards 41 are near the noncontact information medium 10, the inductance L of the coil 12 of the noncontact information medium 10 increases. When a total number of the noncontact information medium 10 and the auxiliary cards 41 is equal to or larger than the predetermined number, then the inductance L of the coil 12 of each noncontact information medium 10 is equal to Lc, and the noncontact information medium 10 can communicate with the reader-writer 20. On the other hand, each of the auxiliary cards 41 does not communicate with the reader-writer 20 because of lack of the IC chip 15.

As explained so far, to hold the communication between the single noncontact information medium 10 and the reader-writer 20, a bundle 41a of the auxiliary cards 41 is arranged near the noncontact information medium 10, whereby an accurate communication can be held between the single noncontact information medium 10 and the reader-writer 20. In FIG. 5, the noncontact information medium 10 is arranged on the left end of the bundle 41a. However, an arrangement position of the noncontact information medium 10 is not limited thereto but the noncontact information medium 10 can be arranged on the right end of the bundle 41a. Alternatively, the noncontact information medium 10 can be arranged not on the end of the bundle 41a but in the middle of the bundle 41a so that the noncontact information medium 10 is put between the auxiliary cards 41a. When the number of noncontact information media 10 is smaller than the predetermined number by which the inductance L of the coil 12 is equal to Lc, then the auxiliary card or cards 41 can be arranged near the noncontact information medium 10 so that the total number of the noncontact information media 10 and the auxiliary cards 41 is equal to the predetermined number. Even in this case, the inductance L of the coil 12 of each noncontact information medium 10 is equal to Lc, whereby an accurate communication can be held between the noncontact information media 10 and the reader-writer 20.

Furthermore, even when a different noncontact information medium or a counterfeit is mixed into the noncontact information media 10, it is possible to determine whether different or counterfeit medium is present. An operation of the communication system when the other noncontact information medium is mixed into the noncontact information media 10 is explained next.

Figure 7:
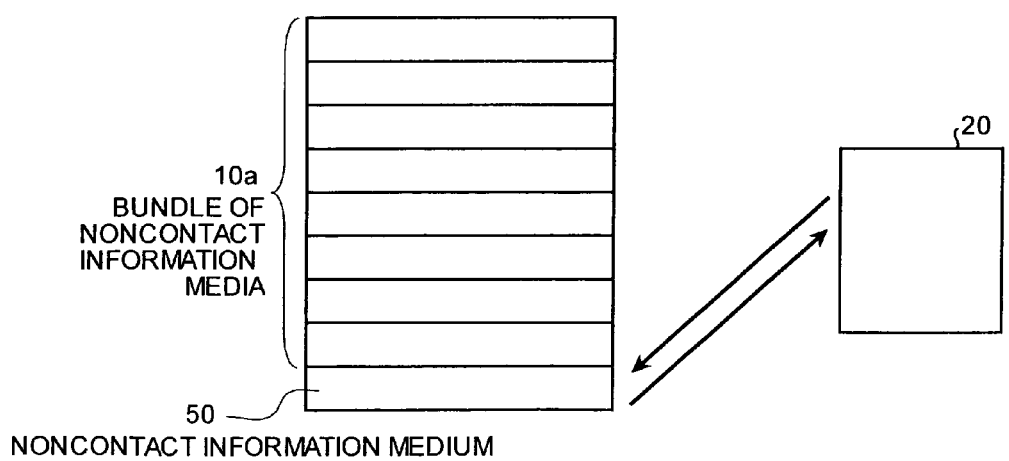
FIG. 7 is a schematic for explaining the operation of the communication system according to the embodiment.
Figure 8:
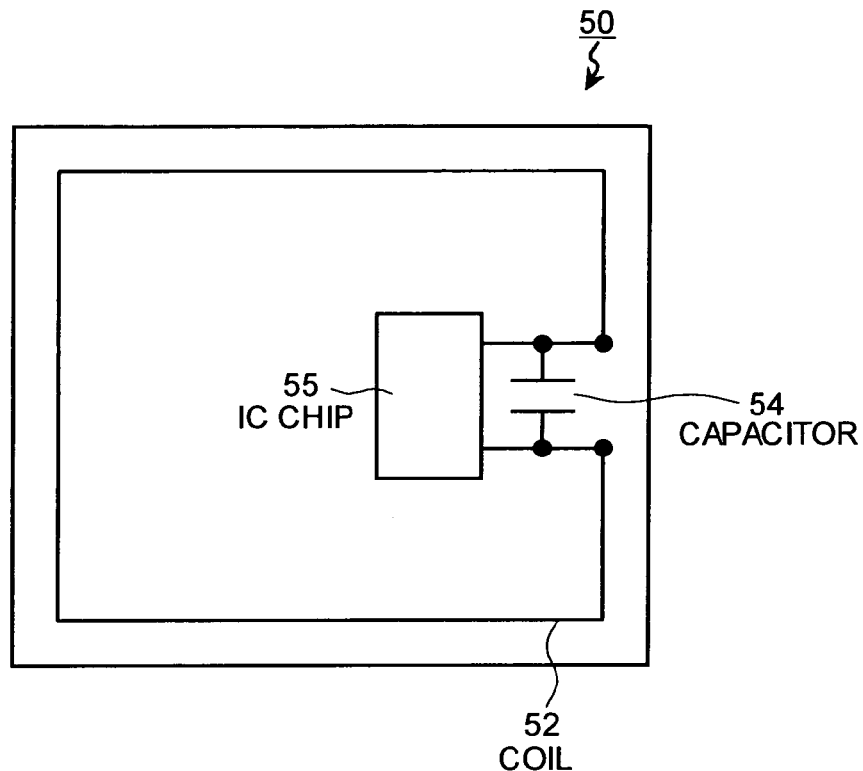
FIG. 8 is a schematic of another noncontact information medium shown in FIG. 7.

FIG. 7 is a diagram of the operation of the communication system when the other noncontact information medium 50 is mixed into the bundle 10a. As shown in FIG. 8, the noncontact information medium 50 includes a coil 52 in which a conductor is not cut off, a capacitor 54, and an IC chip 55. When the noncontact information medium 50 comes close to the reader-writer 20, the coil 52 and the capacitor 54 form a resonance circuit. A resonance frequency of the resonance circuit is equal to the frequency of the radio waves for transmission and reception. When a plurality of such noncontact information media 50 are mixed into the bundle 10a, then only the noncontact information media 50 can communicate with the reader-writer 20 and the noncontact information media 10 cannot communicate with the reader-writer 20 as shown in FIG. 7. The reason is estimated as follows. Since the inductance of the noncontact information medium 50 is higher than that of the noncontact information medium 10, the inductance of the noncontact information medium 50 influences the coil 12 and the capacitor 14 of the noncontact information medium 10. In this way, if the noncontact information medium 50 is mixed into the bundle 10a, the total number of the noncontact information media does not coincide with the total number of noncontact information media that actually communicate with the reader-writer 20. This makes it possible to determine that the other noncontact information medium 50 is mixed into the bundle 10a.

Figure 9:
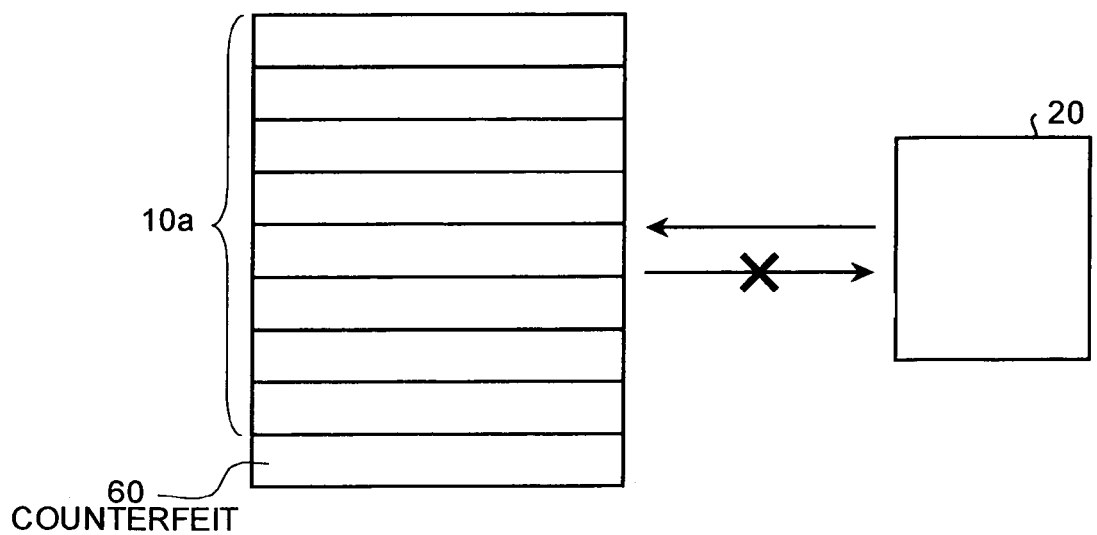
FIG. 9 is a schematic for explaining the operation of the communication system according to the embodiment.
Figure 10:
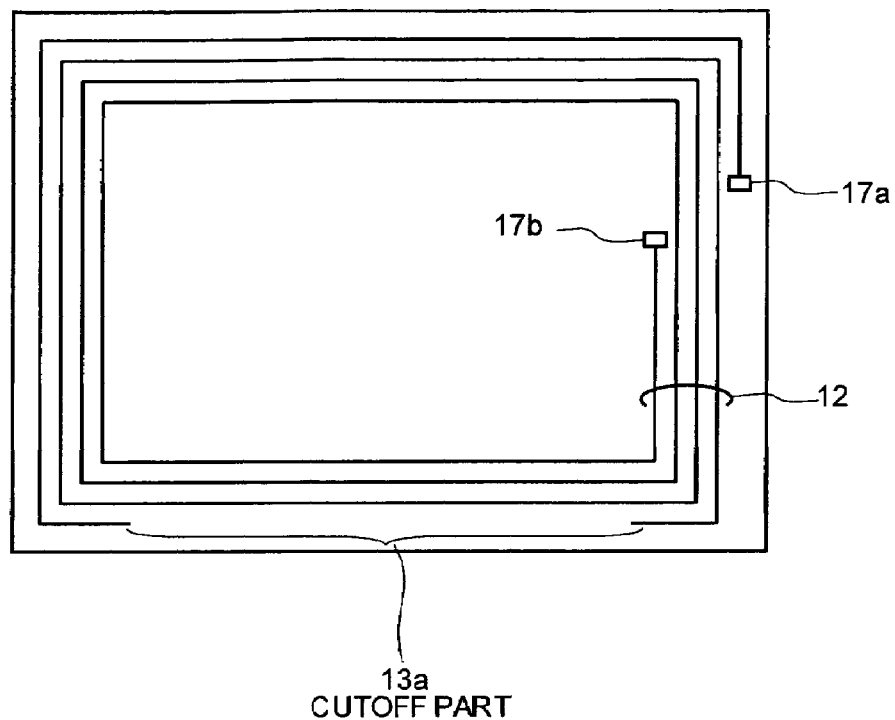
FIG. 10 is a schematic of another noncontact information medium according to the embodiment.

Furthermore, as shown in FIG. 9, even when a counterfeit 60 is mixed into the bundle 10a, it is possible to determine that the counterfeit 60 is present. The counterfeit 60 includes, for example, a coil 52 and a capacitor 54, and it does not include an IC chip. If such a counterfeit 60 is mixed into the bundle 10a, the noncontact information media 10 cannot communicate with the reader-writer 20 because of the influence of the coil 52 of the counterfeit 60 on the noncontact information media 10. In addition, the counterfeit 60 can not perform communications with the reader-writer 20 because of lack of the IC chip. Therefore, even when a bundle 10a including the noncontact information medium equal to or larger in number than the predetermined number is arranged near the reader writer 20, the reader-writer 20 does not receive data from the noncontact information media in the bundle 10a. If communications cannot be thus be held between the noncontact information media in the bundle 10a and the reader-writer 20, it is possible to determine that the counterfeit 60 is mixed into the bundle 10a.

As explained above, the noncontact information medium 10 according to this embodiment includes the cutoff part 13 formed by cutting off a part of the conductor of the coil 12. The noncontact information medium 10 can thereby accurately communicate with the reader-writer 20 even when the noncontact information media 10 equal to or larger in number than the predetermined number are overlapped.

In the communication system that uses the conventional noncontact information media, if many noncontact information media are close to each other, they are mutually influenced by the inductances of the others. As a result, only a few noncontact information media can communicate with the reader-writer. According to the noncontact information medium 10 in this embodiment, however, the closer the noncontact information medium 10 are, the larger the number of noncontact information media 10 that can communicate with the reader-writer. Due to this, the range of the number of communicable noncontact information media 10 widens as compared with the conventional noncontact information medium. The communication system according to this embodiment can, therefore, smoothly read data stored in the noncontact information media 10.

The induced current carried across the coil of the noncontact information medium 10 according to this embodiment is lower than that of the noncontact information medium in which the conductor of the coil 12 is not cut off. Due to this, even when many noncontact information media 10 are communication targets for the reader-writer 20, an amount of power fed by the reader-writer 20 to each of the noncontact information media 10 is small. The reader-writer 20 can, therefore, efficiently feed power to the noncontact information media 10 and the feeding ability of the reader-writer 20 can be suppressed.

By using the auxiliary card 41, accurate communication can be established between each noncontact information medium 10 and the reader-writer 20 even when the number of noncontact information media 10 is smaller than the predetermined number.

Even when the other noncontact information medium 50 or the counterfeit 60 is mixed into the bundle 10a of the noncontact information media, it is possible to determine whether the other noncontact information medium 50 or the counterfeit 60 is mixed into the bundle 10a by comparing the number of noncontact information media that come close to the reader-writer 20 with the number of noncontact information media that communicate with the reader-writer 20.

Figure 11:
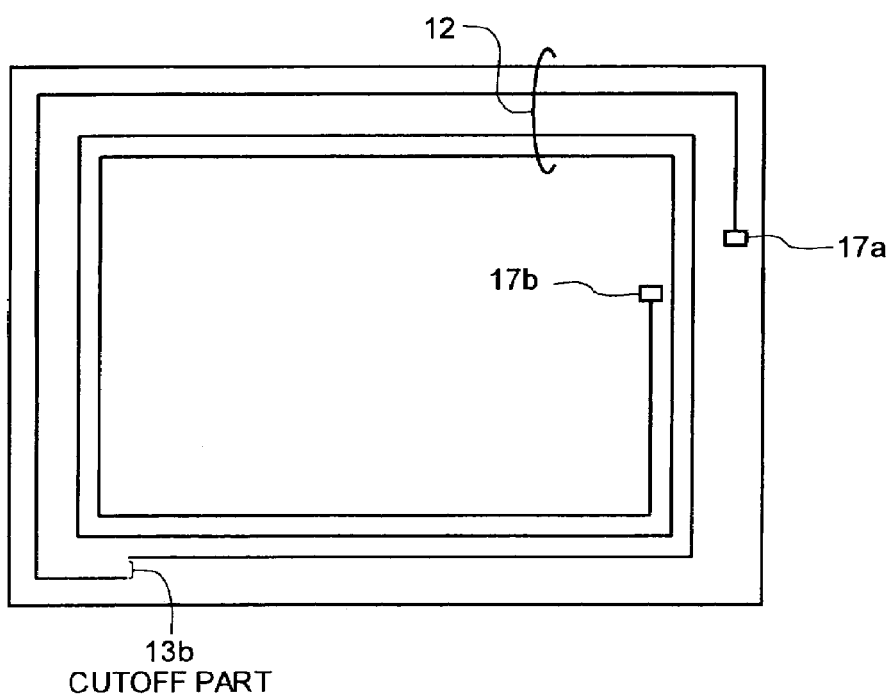
FIG. 11 is a schematic of still another noncontact information medium according to the embodiment.
Figure 12:
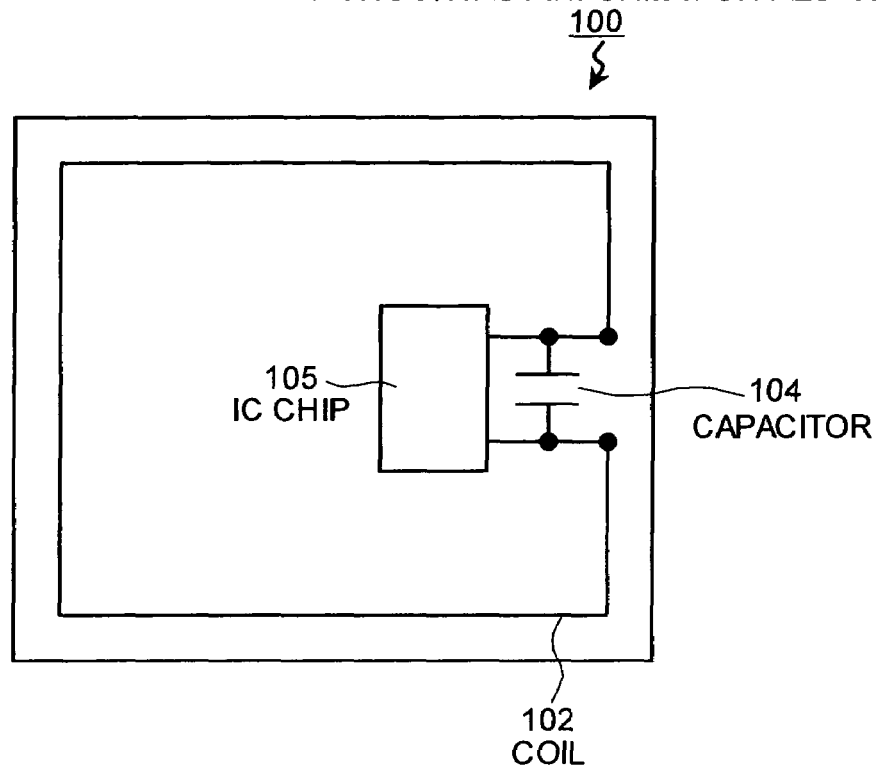
FIG. 12 is a schematic of a conventional noncontact information medium.
Figure 13:
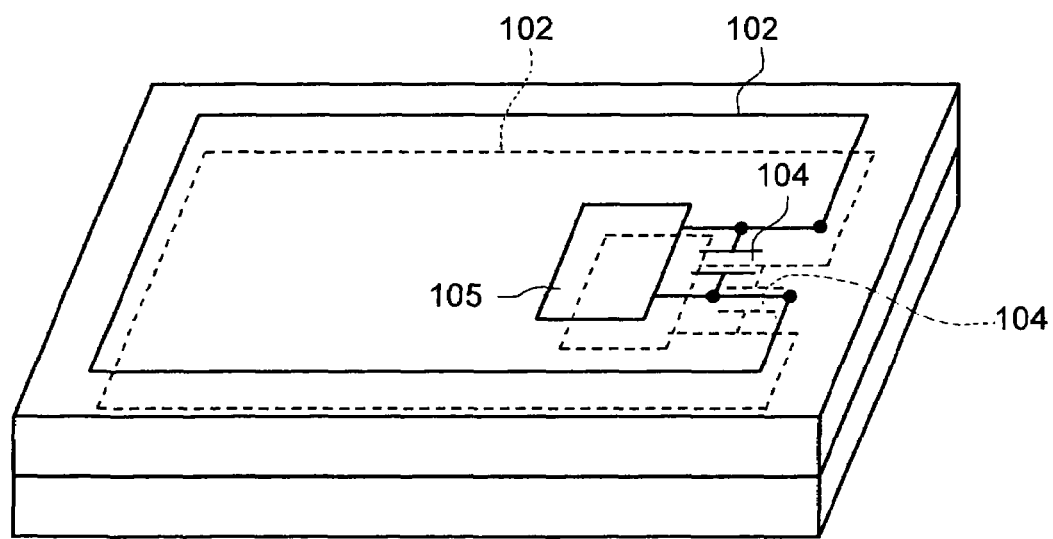
FIG. 13 is a perspective of a state where two noncontact information media of same size overlap.

It has been explained with reference to FIG. 2 that a cut length of the cutoff part 13 of the conductor of the coil 12 of the noncontact information medium 10 is about 10 millimeters. However, the length is not limited to about 10 millimeters but the coil 12 can have a cutoff part 13a having a length larger than 10 millimeters. Alternatively, as shown in FIG. 11, the coil 12 can have a cutoff part 13b formed by cutting off the conductor by one turn. Whether the cutoff part 13 is replaced by the cutoff part 13a or 13b, an accurate communication can be established between the noncontact information media 10 equal to or larger in number than the predetermined number and the reader-writer 20.

The memory 15c of the IC chip 15 can store ID information, predetermined money types, a shop number, cipher data and the like. Among the information, the money type represents a value of the article which the noncontact information medium 10 includes. The shop number identifies a shop to which the noncontact information medium 10 is distributed. A distribution route of the noncontact information medium 10 can be known by referring to the shop number. The memory 15c also includes data indicating that the article is exchanged with the money or not exchanged yet. By storing the cipher data, distribution of counterfeits is prevented. Examples of the cipher data include a result of performing a specific process on a specific number of an individual IC chip. The reader-writer 20, which is a data reader, performs this specific process, compares the process result of the reader-writer 20 with the cipher data stored in the memory 15c. If they coincide, the reader-writer 20 determines that the noncontact information medium is a legal noncontact information medium. If they do not coincide, the reader-writer 20 determines that the noncontact information medium is a counterfeit. By thus reading and writing the data stored in the memory 15c, the reader-writer 20 can easily know the distribution of the noncontact information medium 10.

While it has been explained that the my-d chip (manufactured by Infineon Technologies AG) is used as the IC chip 15, the IC chip 15 is not limited to the my-d chip. Furthermore, while it has been explained that the IC chip 15 includes the transmitter-receiver 15a, the controller 15b, and the memory 15c, a configuration of the IC chip 15 is not limited thereto but the IC chip 15 can be configured to include the transmitter-receiver 15a and the memory 15c.

In this embodiment, the cutoff part 13 formed by cutting off a part of the conductor of the coil 12 is provided so as to make it difficult to carry the alternating current across the coil 12 and to increase the impedance of the noncontact information medium 10. However, the present invention is not limited thereto. By controlling the capacitance C of the capacitor 14, the impedance of the noncontact information medium 10 can be increased. Alternatively, by inserting a predetermined resistance into a path through which the induced current is applied, the impedance of the noncontact information medium 10 can be increased. It is, however, necessary to control the capacitance C, the inductance L, and the resistance so that the resonance frequency fr coincides with the frequency fc of the radio waves for transmission and reception when the predetermined number or more of noncontact information media 10 come close to the reader-writer 20.

In this embodiment, the instance that the noncontact information medium 10 is used as the so-called special premium has been explained. However, the present invention is not limited to this instance. The noncontact information medium can be used as an article such as a card, a patient's chart used in a hospital, a book, an envelope, or a sheet, or used as a noncontact information medium included in an article such as a box of an equal or similar shape to that of the medium, a container, or a package. Even when these articles are arranged to be close to the reader-writer or overlapped, an accurate communication can be ensured by providing the noncontact information medium according to this embodiment.

As explained so far, the present invention exhibits an advantage in that accurate communication can be established between a plurality of noncontact information media and the reader-writer even when many noncontact information media are close to the reader-writer.

INDUSTRIAL APPLICABILITY

As can be understood, the noncontact information medium and the communication system that uses the noncontact information medium according to the present invention are effective when communication is to be established between a plurality of noncontact information media and a reader-writer while many noncontact information media are close to the reader-writer. They are particularly suited when the noncontact information media communicate with the reader-writer while a plurality of thin noncontact information media are overlapped.

The invention claimed is:
1. A noncontact information medium comprising:
a first coil formed by at least one turn of a conductor, at least a part of which is cut off;
a capacitor that forms a resonance circuit together with the first coil; and
a control circuit that controls information transmitted to and received from a reader-writer, wherein
the first coil has an inductance for making a resonance frequency of the resonance circuit higher than a frequency of electromagnetic waves transmitted from the reader-writer when only the noncontact information medium is present near the reader-write, and the first coil generates an inductance for making a resonance frequency of the resonance circuit equal to a frequency of electromagnetic waves transmitted from the reader-writer when a plurality of other noncontact information media having a substantially similar configuration as the noncontact information medium are present close to the reader-writer.

2. The noncontact information medium according to claim 1, further comprising:

at least one auxiliary card having a second coil substantially equal in inductance to the first coil, wherein the first coil generates an inductance for making a resonance frequency of the resonance circuit equal to a frequency of electromagnetic waves transmitted from the reader-writer when said at least one auxiliary card having the second coil is present close to the reader-writer.

3. The noncontact information medium according to claim 1, wherein the first coil is arranged around the control circuit.

4. The noncontact information medium according to claim 3, wherein the first coil includes said at least one turn of the conductor around the control circuit.

5. The noncontact information medium according to claim 3, wherein the first coil includes a plurality of turns of the conductor around the control circuit.

6. A communication system that holds a radio communication using electromagnetic induction, the communication system comprising:

a plurality of noncontact information media each including a coil formed by at least one turn of a conductor, at least a part of which is cut off;

a capacitor that forms a resonance circuit together with the coil; and a control circuit that controls transmission and reception of information via the resonance circuit; and a reader-writer that supplies power to the noncontact information media, transmits data to the noncontact information media, and receives data transmitted from the noncontact information media, wherein the coil has an inductance for making a resonance frequency of the resonance circuit higher than a frequency of electromagnetic waves transmitted from the reader-writer when only the noncontact information medium is present near the reader-writer, and the coil generates an inductance for making a resonance frequency of the resonance circuit equal to a frequency of electromagnetic waves transmitted from the reader-writer when a plurality of other noncontact information media having substantially similar configuration as the noncontact information medium are present close to the reader-writer.

7. A communication system that holds a radio communication using electromagnetic induction, the communication system comprising:

a noncontact information medium including a first coil formed by a conductor, at least a part of which is cut off;

a capacitor that forms a resonance circuit together with the first coil; and a control circuit that controls transmission and reception of information via the resonance circuit;

an auxiliary card having a second coil substantially equal in inductance to the first coil of the noncontact information medium; and a reader-writer that supplies power to the noncontact information medium, transmits data to the noncontact information medium, and receives data transmitted from the noncontact information medium, wherein the first coil generates an inductance for making a resonance frequency of the resonance circuit equal to a frequency of electromagnetic waves transmitted from the reader-writer when the auxiliary card with the second coil having substantially same inductance as that of the first coil is present close to the reader-writer.

* * * * *